United States Patent [19]

David et al.

[11] Patent Number: 4,774,678

[45] Date of Patent: Sep. 27, 1988

[54] VIDEO SIGNAL PROCESSING

[75] Inventors: Morgan W. A. David, Farnham; David J. Hedley, Winchester, both of United Kingdom

[73] Assignee: Sony Corporation, Tokyo, Japan

[21] Appl. No.: 836,158

[22] Filed: Mar. 4, 1986

[30] Foreign Application Priority Data

Mar. 7, 1985 [GB] United Kingdom ............... 8505920

[51] Int. Cl.$^4$ ............................................. G09G 1/06
[52] U.S. Cl. ...................................... 364/518; 358/11; 382/45
[58] Field of Search .................... 364/518, 521, 723; 340/750, 793, 798–800; 382/44–47; 358/11, 138

[56] References Cited

U.S. PATENT DOCUMENTS

| 3,882,304 | 5/1975 | Walters ........................... 364/723 X |
| 4,580,134 | 4/1986 | Campbell et al. ............... 340/798 X |
| 4,602,285 | 7/1986 | Beaulier et al. ................. 364/723 X |
| 4,618,858 | 10/1986 | Belch .............................. 364/521 X |

FOREIGN PATENT DOCUMENTS 1594341  6/1984  United Kingdom .

Primary Examiner—Gary V. Harkcom
Assistant Examiner—H. R. Herndon
Attorney, Agent, or Firm—Lewis H. Eslinger; Donald S. Dowden

[57] ABSTRACT

Digital video sample values from a first sample domain are mapped to a second sample domain using a mapping function which involves a change in image size, for example, for a digital video effects unit. The apparatus comprises an address generator and a processor for computing, for each sample position in the second sample domain, the position of a point in the first sample domain which, using the mapping function, would map onto that sample position in the second sample domain, and an interpolator for obtaining from available input sample values an interpolated sample value for that point in the first sample domain, the interpolated sample value being used as the sample value for the sample position in that second sample domain.

11 Claims, 2 Drawing Sheets

VIDEO SIGNAL PROCESSING

BACKGROUND OF THE INVENTION

1. Field of the Invention

This invention relates to video signal processing, and more particularly, but not exclusively, to methods of and apparatus for digital video sample mapping. This technique is used, for example, in digital video effects units, in which digital television signals are manipulated to give special effects.

2. Description of the Prior Art

Such special effects are now well known to television viewers, and enable images on the cathode ray tube of a television receiver to be, for example, off-set (moved in any direction), scaled (expanded or compressed in size), rolled (rotated) in two or three dimensions, and so on. Such special effects can be generated by mapping video sample values from one sample domain to another with a dynamically changing mapping function.

UK patent specification No. GB-A-1 594 341 discloses a processing system capable of effecting relatively low-speed scaling of an image using a technique similar to that used in a television standards converter.

However, consider the example shown in FIG. 1 of the accompanying drawings. In an input array A, sample values $a_{n-2}$ to $a_{n+3}$ correspond to six successive sample positions along a horizontal scan line of an input digital television signal. Suppose that the requirement is to compress at least that part of the picture in the ratio 4:3. Mere compression would simply move the sample values $a_{n-2}$ to $a_{n+3}$ to more closely spaced points in an array B'. However, the required output array B in fact consists of sample positions identical with those of the input array A, which is not the case in television standards conversion, so it is further necessary to map the sample values of the array B' onto the output array B, so that the sample values have the correct magnitudes and are in the correct positions.

A relatively simple solution to this problem is to use for each sample position in the output array B that sample value from the array B' which is spatially nearest. Obviously this results in inaccuracies, and other more sophisticated solutions have been proposed, although these tend to involve complex calculations and to require a large amount of storage, particularly where more than one dimension is involved. Also, the previously proposed solutions tend not to operate satisfactorily where the mapping function is changing rapidly.

SUMMARY OF THE INVENTION

One subject of the present invention is to provide a method of back interpolation for deriving sample values for such an output array.

Another object of the present invention is to provide an improved method and apparatus for mapping digital video sample values from a first sample domain to a second sample domain using a mapping function which involves a change in image size.

According to the present invention there is provided a method of mapping digital video sample values from a first sample domain to a second sample domain using a mapping function which involves a change in image size, the method comprising, for each sample position in said second sample domain:

computing the position of a respective point in said first sample domain which, using said mapping function, would map onto said sample position in said second sample domain;

obtaining by interpolation from available input sample values an interpolated sample value for said point in said first sample domain; and using said interpolated sample value as the sample value for said sample position in said second sample domain.

According to the present invention there is also provided apparatus for mapping digital video sample values from a first sample domain to a second sample domain using a mapping function which involves a change in image size, the apparatus comprising:

means for computing, for each sample position in said second sample domain, the position of a respective point in said first sample domain which, using said mapping function, would map onto said sample position in said second sample domain; and an interpolator for obtaining from available input sample values an interpolated sample value for said point in said first sample domain; said interpolated sample value being used as the sample value for said sample position in said second sample domain.

The above, and other objects, features and advantages of this invention will be apparent from the following detailed description of illustrative embodiments which is to be read in connection with the accompanying drawings.

DESCRIPTION OF THE PREFERRED EMBODIMENTS

The embodiment to be described is for use in a digital video effects unit in which a digital television signal is manipulated to give special effects. The method involved will first be described, and then an apparatus for performing the method will be described.

Many special effects which are required involve the image which is to be displayed on a cathode ray tube being expanded or compressed in size relative to an input image. In some cases movement, additional to the movement inherent in the expansion or compression, may be involved. The present invention is particularly concerned with special effects which involve compression in size of at least part of an image, this compression in size being effected by manipulation of the input image information, followed by storage of the manipulated information. The invention can also be applied to special effects which involve expansion in size, but in this case the input information is stored unchanged, and the necessary manipulation of the input information is done on reading out the stored information, because to do the manipulation before storage would unnecessarily increase the storage capacity required.

Figure 1:
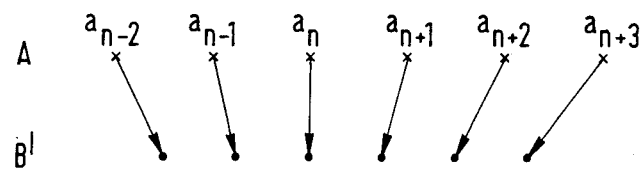
FIG. 1 shows diagrammatically parts of horizontal scan lines of a digital television signal for explaining the problem of the present invention.
Figure 2:
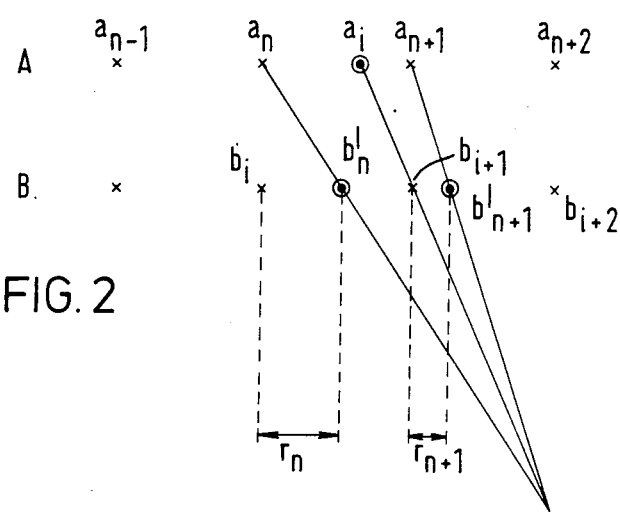
FIG. 2 shows diagrammatically parts of horizontal scan lines of a digital television signal for explaining a method according to the present invention.

The method will first be described as applied to a one dimensional compression. The top line in FIG. 2 represents successive sample positions along a horizontal scan line of an input array A forming part of a first sample domain of a digital television signal. As the result of applying a mapping function selected to achieve the required special effect, the sample points $a_n$ and $a_{n+1}$ in the input array A map to points $b'_n$ and $b'_{n+1}$ in an output array B forming part of a second sample domain. However, the points $b'_n$ and $b'_{n+1}$ do not correspond to actual sample positions in the output array B. The actual sample positions nearest to the points $b'_n$ and $b'_{n+1}$ in the output array B are assumed to be $b_i$ and $b_{i+1}$.

If each difference between successive sample positions in the input array A and the output array B is taken as unity, then the addresses of the sample positions $b_i$ and $b_{i+1}$ may be considered to be the integral parts of the addresses of the points $b'_n$ and $b'_{n+1}$ respectively. The residual parts of the addresses are taken to be $r_n$ and $r_{n+1}$ respectively as indicated in FIG. 2. Then:

$$r_n = (b'_n) - (b_i)$$

and:

$$r_{n+1} = (b'_{n+1}) - (b_{i+1})$$

the brackets indicating the addresses of the points or sample positions indicated within the brackets.

Figure 3:
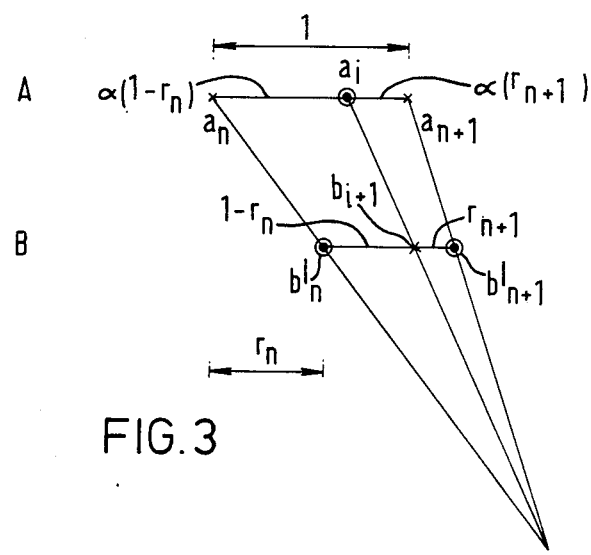
FIG. 3 shows an enlarged portion of FIG. 2.

Reference will now be made to FIG. 3 which shows a portion of FIG. 2 on an enlarged scale. In the input array A, the point $a_i$ is the point which, using the given mapping function, maps exactly onto the point $b_{i+1}$ in the output array B. It can be seen by similar triangles that:

$$(a_i) - (a_n) \text{ is proportional to } 1 - r_n$$

and:

$$(a_{n+1}) - (a_i) \text{ is proportional to } r_{n+1}$$

if the ratio is $\alpha$, then the address of the required sample value is:

$$(a_n) + \alpha(1 - r_n)$$

but:

$$\alpha(1 - r_n) + \alpha(r_{n+1}) = 1$$

therefore:

$$\alpha = \frac{1}{1 - r_n + r_{n+1}}$$

therefore the address of the sample value to be interpolated is:

$$(a_i) = (a_n) + \frac{1 - r_n}{1 - r_n + r_{n+1}}$$

As $r_n$ and $r_{n+1}$ are known when the mapping function has been applied to the sample positions in the input array A, this means that the address and hence the position of the point $a_i$ can easily be calculated, and this position is then used to select the coefficient of a conventional interpolator. In other words, because the sample values at the sample positions $a_n$ and $a_{n+1}$ in the input array A are known, and because the above expression enables the address of the point $a_i$ in the input array A to be calculated, the sample value corresponding to the point $a_i$ can be linearly interpolated, and this sample value is one which may be used for the sample position $b_{i+1}$ in the output array B. This process can be carried out for each successive sample position in the output array B, and it is to be noted that if the mapping function changes between the sample positions $b'_n$ and $b'_{n+1}$ in the output array B, then the interpolated sample value used for the sample position $b_{i+1}$ will be a linear interpolation of the original and changed mapping functions.

In a practical case it is likely that two dimensional compression will be required, and it will be seen that the above method can readily be extended to a two dimensional case. It is possible to effect the necessary interpolation linearly in two stages using horizontally disposed sample positions as described above, and also vertically disposed sample positions. Preferably the interpolation is done in a single stage for both dimensions using sample values in a moving matrix of sample positions, and by multiplying the sample values by respective weighting coefficients and summing the resulting products, as in a television standards converter.

Figure 4:
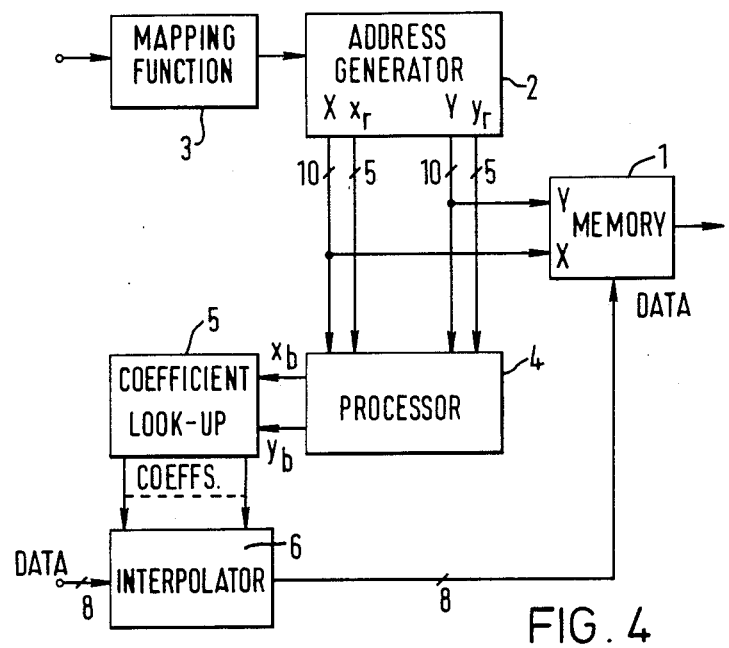
FIG. 4 shows in block diagrammatic form an embodiment of apparatus according to the present invention.

The embodiment of apparatus according to the present invention will now be described with reference to FIG. 4. The apparatus comprises an output memory 1, an address generator 2, a mapping function generator 3, a processor 4, a coefficient look-up table device 5, and an interpolator 6.

The output memory 1 can store data relating to one field of a video signal. It is assumed that the data, that is the sample values corresponding to each sample position in the field, are in the form of respective 8-bit words, and that each sample position in the field is designated by two 10-bit words used to identify the sample position in the horizontal and vertical, that is the X and Y, directions respectively.

The address generator 2 generates successive addresses each in the form of two 10-bit words designating X and Y, and moreover, under the control of the mapping function generator 3, generates two 5-bit words respectively designating the residuals $x_r$ and $y_r$. The mapping function, which may change from sample position to sample position, specifies the compression which is to be applied to the image in that field, and the address generator 2 operates to calculate the residuals $x_r$ and $y_r$ which identify the point, relative to the sample position designated by the address X, Y, from which the mapping function will cause the sample value at the address X, Y to be mapped.

Each address X, Y and the corresponding residuals $x_r$ and $y_r$ are supplied to the two-dimensional processor 4 which may be a programmable read only memory (PROM) and which operates to predict in the manner described above the position on the input array of a sample that would map exactly onto the location pointed to by the address X, Y then being supplied to the memory 1. The address of this predicted position is designated $x_b$, $y_b$ in FIG. 5, and respective 5-bit words corresponding to $x_b$ and $y_b$ are derived and supplied by the processor 4 to the coefficient look-up table device 5.

The coefficient look-up table device 5 which may be a PROM supplies, for example, sixteen weighting coefficients to the two-dimension interpolator 6, to which 8-bit input data words are also supplied. The coefficient look-up table device 5 and the interpolator 6 together operate, generally in the manner of such elements in a television standards converter, to derive from a moving matrix of sixteen sample values from the current field at the sixteen sample positions nearest to the predicted position $x_b$, $y_b$, a calculated sample value for the position $x_b$, $y_b$ which calculated sample value is supplied to the memory 1 to be stored at the location corresponding to the address X, Y for subsequent read-out when the field stored therein is to be displayed, recorded or transmitted.

Figure 5:
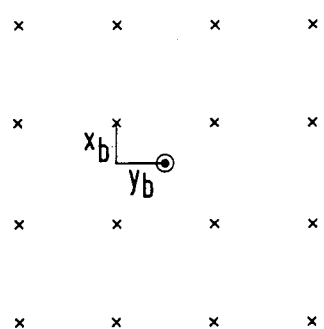
FIG. 5 shows a matrix of sample positions.

The moving matrix of sixteen sample values has been assumed to correspond to the sixteen sample positions in one field and nearest to the predicted position $x_b$, $y_b$, as shown in FIG. 5. The required calculated sample value is derived by multiplying the sample value at each of the sixteen sample positions by the respective weighting coefficient, and summing the resulting sixteen products to derive the calculated sample value. If required, a moving matrix comprising more than sixteen sample values can be used.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of mapping digital video sample values from a first sample domain to a second sample domain using a mapping function which involves a change in image size, wherein identical sample positions are employed in both sample domains, the method comprising, for each sample position in said second sample domain:

computing the position of a point in said first sample domain which, using said mapping function, would map onto said sample position in said second sample domain;

obtaining by interpolation from available input sample values associated with respective sample positions which are adjacent to and on opposite sides of said point in said first sample domain an interpolated sample value for said point in said first sample domain; and using said interpolated sample value as the sample value for said sample position in said second sample domain.

2. A method according to claim 1 wherein said change in image size involves compression.

3. A method according to claim 2 wherein said compression is in two dimensions.

4. A method according to claim 3 wherein said position of said point in said first sample domain is expressed as two residuals which respectively represent the horizontal and vertical distances of said point from an adjacent sample position in said first sample domain.

5. A method according to claim 4 wherein said mapping function is dynamically changing.

6. A method according to claim 3 wherein said interpolation uses a moving matrix of said input sample values, and there is derived for said position of said point in said first sample domain a plurality of weighting coefficients, each said input sample value is multiplied by a respective said weighting coefficient, and the resulting products are summed to form said interpolated sample value.

7. A method according to claim 1 wherein said interpolated sample value is supplied to a memory for storage prior to display, recording or transmission.

8. A method according to claim 7 wherein said memory is a field store.

9. Apparatus for mapping digital video sample values from a first sample domain to a second sample domain using a mapping function which involves a change in image size, wherein identical sample positions are employed in both sample domains, the apparatus comprising:

means for computing, for each sample position in said second sample domain, the position of a point in said first sample domain which, using said mapping function, would map onto said sample position in said second sample domain; and an interpolator for obtaining from available input sample values associated with respective sample positions which are adjacent to and on opposite sides of said point in said first sample domain an interpolated sample value for said point in said first sample domain;

said interpolated sample value being used as the sample value for said sample position in said second sample domain.

10. Apparatus according to claim 9 wherein said change in image size involves compression in two dimensions.

11. Apparatus according to claim 10 wherein said means for computing comprises an address generator for successively generating the addresses of points in said second sample domain to which sample positions in said first sample domain map using said mapping function, and a processor for deriving from each said address the address of said point in said first sample domain which, using said mapping function, would map onto said sample position in said second sample domain.

* * * * *